July 29, 1930.  L. D. SOUBIER  1,771,904
GLASS WORKING TANK
Filed Feb. 16, 1927   5 Sheets-Sheet 1
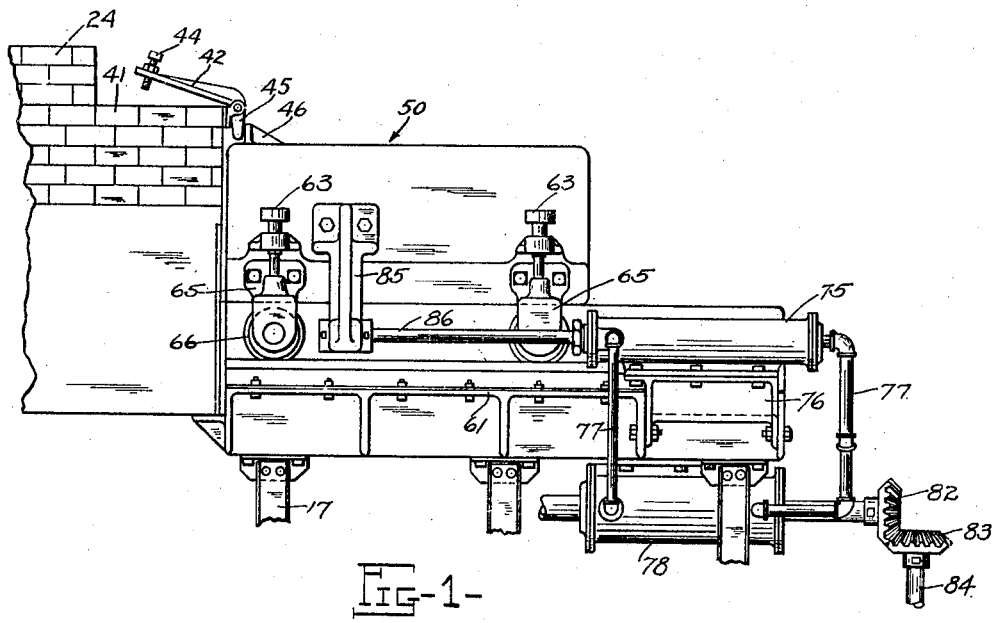
Fig-1-
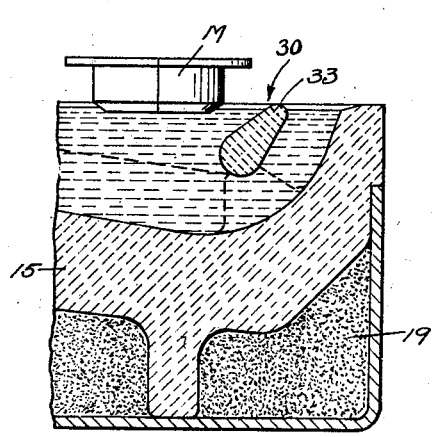
Fig-2-
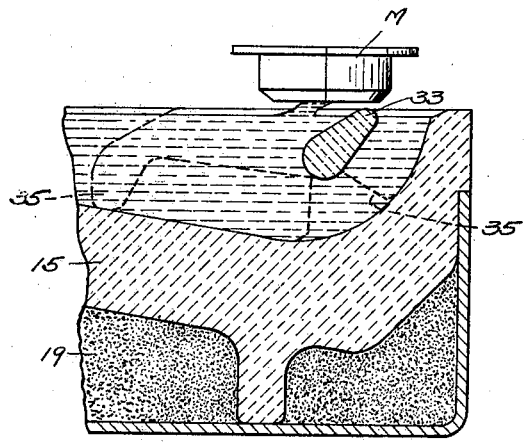
Fig-3-
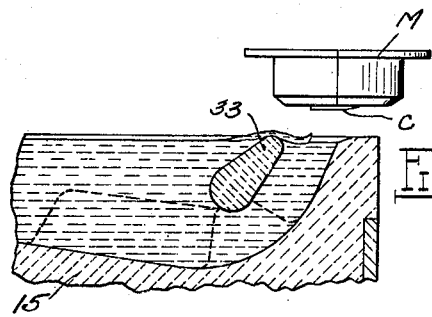
Fig-4-
Inventor
Leonard D. Soubier
By J. F. Rule, Attorney

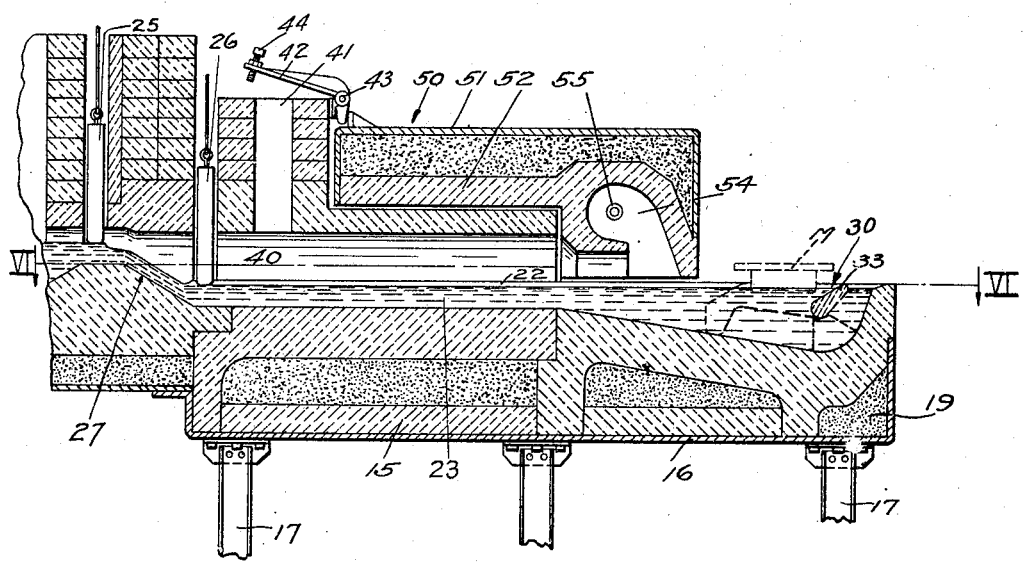
Fig-5-
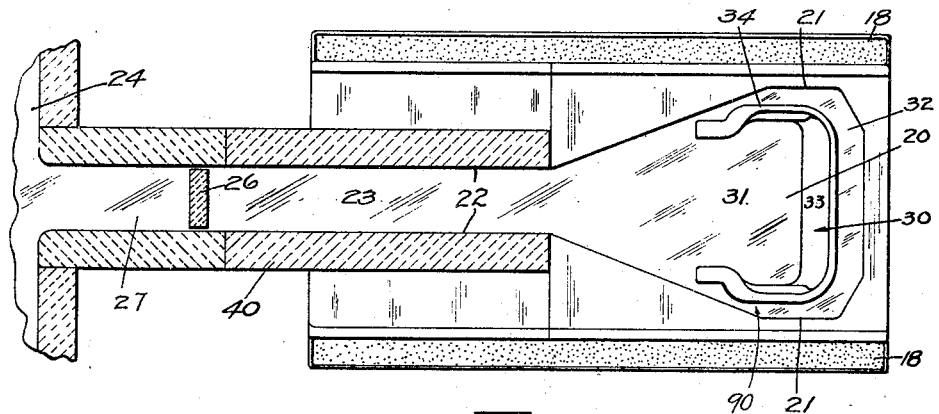
Fig-6-

July 29, 1930.    L. D. SOUBIER    1,771,904
GLASS WORKING TANK
Filed Feb. 16, 1927    5 Sheets-Sheet 3
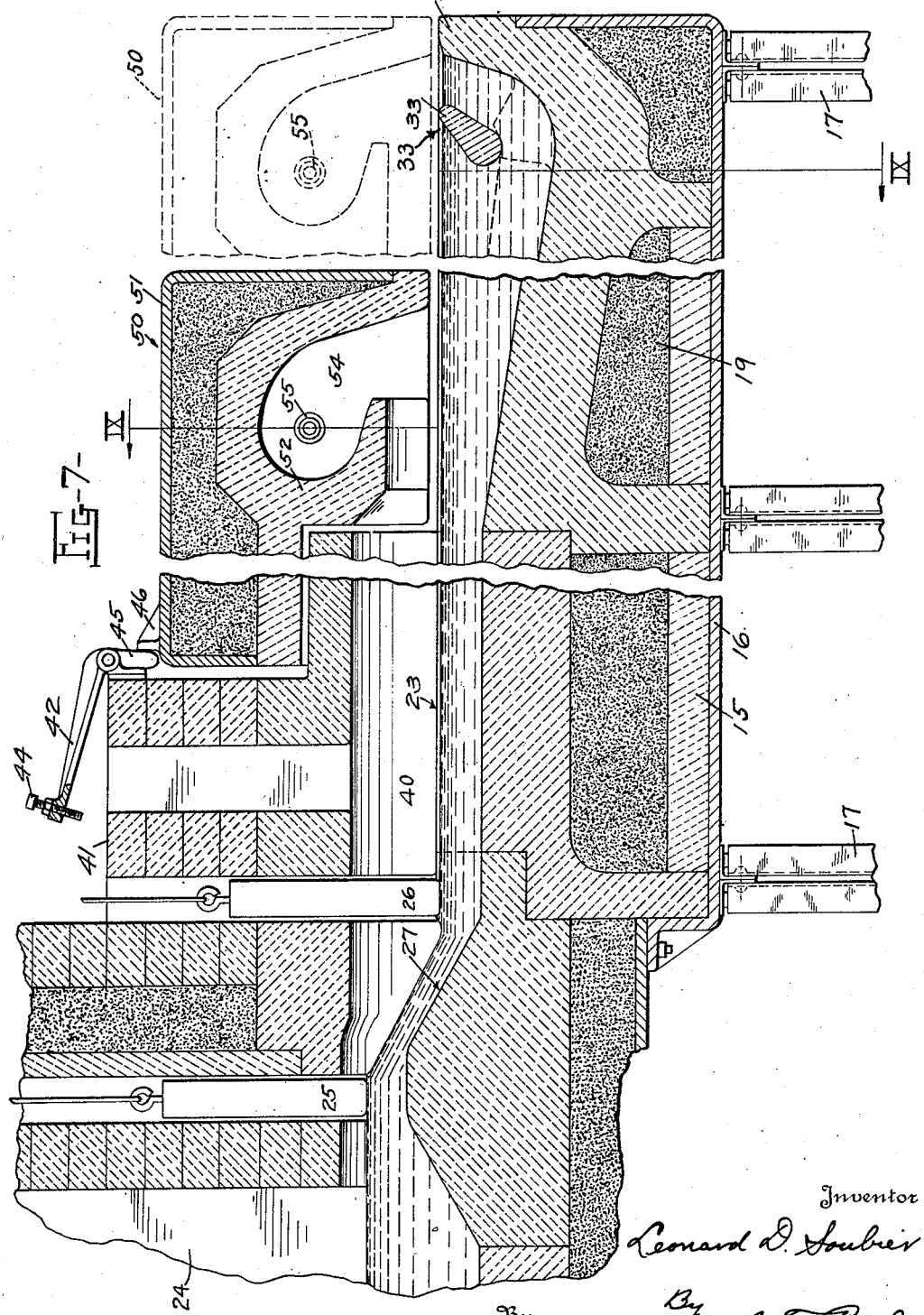
Inventor
Leonard D. Soubier
By J. F. Rule,
Attorney

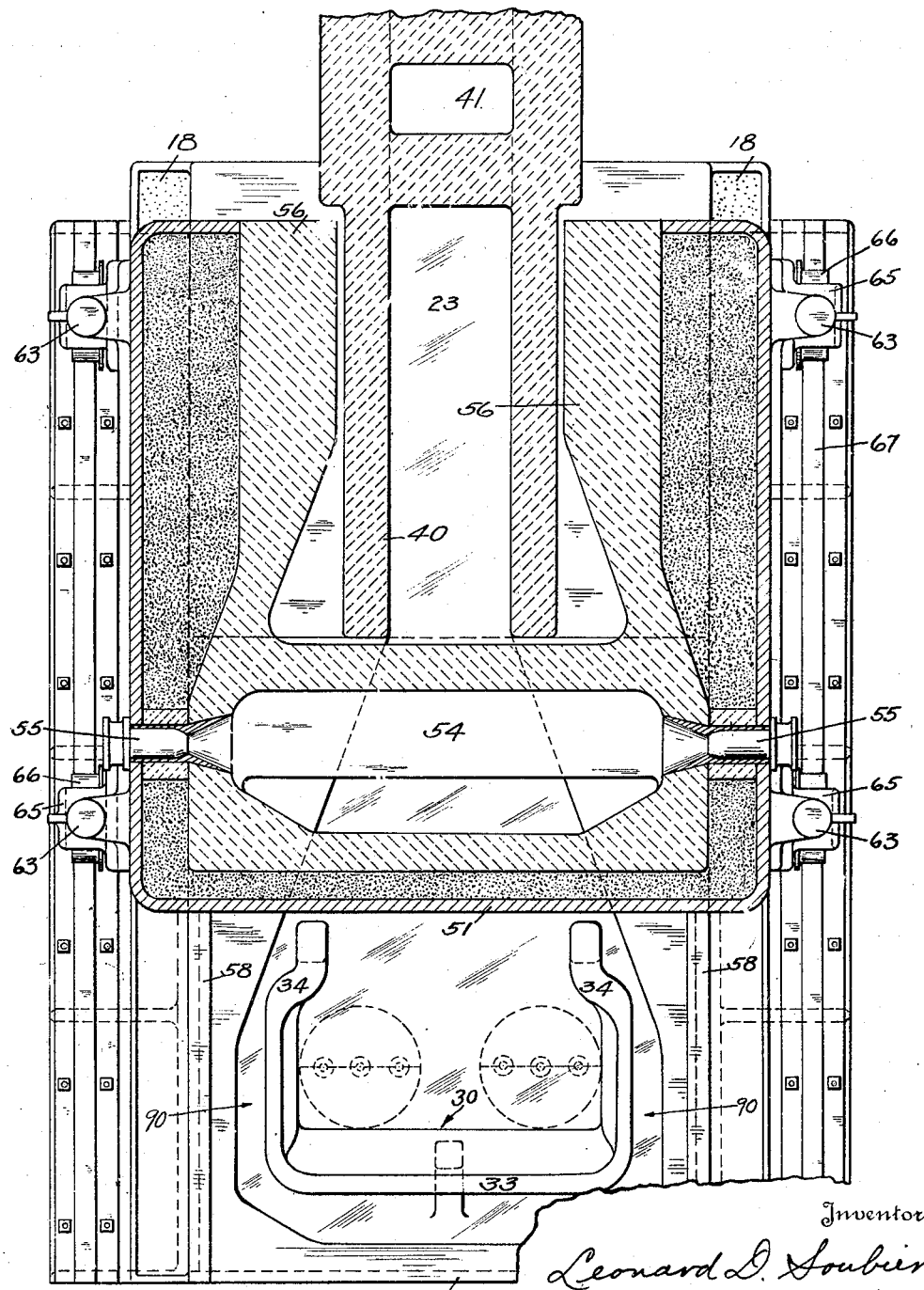

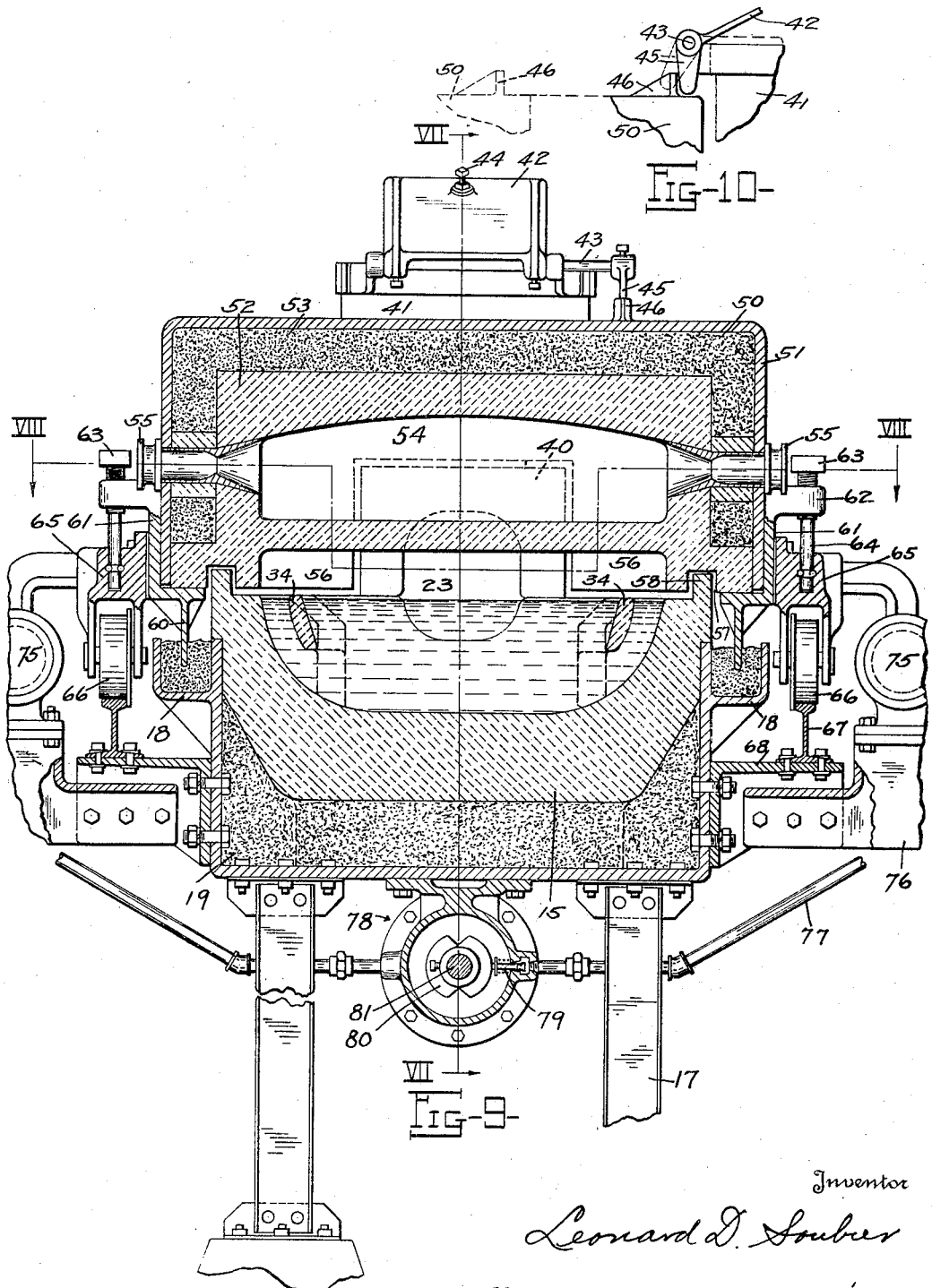

Patented July 29, 1930

1,771,904

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS-WORKING TANK

Application filed February 16, 1927. Serial No. 168,726.

The present invention relates to improvements in glass working tanks and particularly to a tank from which charges of molten glass are periodically gathered into forming molds by suction.

An object of my invention is to provide means automatically operating in timed relation to movements of apparatus which gathers charges of glass from the tank, to enclose and apply heat to the area from which charges are gathered, during the intervals between the charge gathering periods or in any other preferred timed relation.

Another object is to provide in a stationary glass working tank, a comparatively wide gathering area and a relatively narrow supply channel leading to said area from a supply body of molten glass so that stagnation of the glass between the main supply body and the gathering area is minimized.

A further object is to provide a stationary working tank provided with a dam of such form that individual gathering and cut-off receiving areas are created. The cut-off receiving area is of such form that chilled portions of glass severed from the bottom of the gathering mold must pass beneath the surface and be reheated before returning to the gathering area or follow a path so arranged that before these chilled portions have reached the gathering area by movement along the surface, they will be completely reheated and re-assimilated by the main body of molten glass. Thus, constant supply of glass of uniform temperature and viscosity to the gathering area is at all times assured.

Other objects will be apparent hereinafter.

In the accompanying drawings:

Fig. 1 is a side elevation illustrating the application of a reciprocable hood to a stationary glass working tank, showing the mechanism for moving the hood.

Figs. 2, 3 and 4 are detail sections showing the manner in which the mold gathers its charge or charges of glass from the tank.

Fig. 2 shows the mold dipping into the gathering area.

Fig. 3 illustrates the manner in which the mold moves upwardly and forwardly relative to the gathering area.

Fig. 4 shows the cut-off in mold closing position and the chilled cut-off portion of glass deposited in the cut-off receiving area.

Fig. 5 is a vertical central longitudinal section through the glass working tank and the hood or cover.

Fig. 6 is a part sectional plan taken along the line VI—VI of Fig. 5.

Fig. 7 is a detail longitudinal section taken substantially on the line VII—VII of Fig. 9, the operating devices being eliminated for the sake of clarity.

Fig. 8 is a sectional view taken substantially on the line VIII—VIII of Fig. 9.

Fig. 9 is a vertical transverse sectional view taken substantially along the line IX—IX of Fig. 7.

Fig. 10 is a fragmentary detail view showing the means for operating the draft control damper.

The terms "gathering area" and "cut-off receiving area", employed herein, have reference, respectively, to the area from which charges of glass are gathered into the molds, and the area into which the chilled cut-off or tail portions of glass severed from the gathering molds are deposited.

Referring to the accompanying drawings, the glass working tank 15, which is preferably though not necessarily stationary, is formed of refractory blocks arranged in a metal frame or casing 16 supported at the proper elevation on frame members 17 which may be in the form of channel iron units or the like. This frame or casing 16 which receives the refractory blocks forming the stationary tank is provided with longitudinal channels 18 along its sides (Figs. 6 and 9) for a purpose brought out hereinafter. In constructing the tank, the tank blocks are of such form that they are spaced from the bottom and a major portion of the sides of the supporting casing or frame 16 so that a suitable insulating material 19 may be placed between said blocks and casing for obvious reasons.

The forward or gathering end of the tank includes a relatively deep recess 20 whose side walls 21 are arranged in parallel relation to each other for a short distance and then converge rearwardly to a point at which they merge into parallel side walls 22 of a relatively narrow supply channel or trough 23 through which molten glass flows to the gathering area 20 from a main supply body of glass in a furnace or tank 24. Flow of glass to and through the supply channel 23 may be controlled by a vertically movable valve or gate 25. The slide block 26 located rearwardly of the stack serves to deflect the products of combustion from the channel into the stack 41. By forming a comparatively narrow supply channel 23 to conduct molten glass from the furnace 24 to the gathering area 20, and by inclining the inner end 27 of the channel 23 between said flow control gates (Figs. 5 and 7), such rapid movement of the glass through the supply channel is effected that stagnation of the glass is practically eliminated. In this construction, the width of the channel is such that practically all of the glass in the channel is moving toward the gathering area, this being in direct contrast to the glass movement in tanks of the ordinary construction, movement in the latter instance being confined more or less to glass along the center of the stream, the remaining portion of glass becoming chilled and sluggish in its passage to the front of the tank.

A dam 30 (Fig. 6) is arranged to divide the working tank 15 into a gathering area 31 and a cut-off receiving area 32 at the forward end. This dam 30 is formed of suitable refractory material and is substantially U-shape (Figs. 6 and 8). Obviously, the shape of the tank may determine the shape of the dam, so that variations from the U-shape may be necessary. The transverse body portion 33 of this dam is declined rearwardly (Figs. 2, 3 and 4) so that chilled portions of glass deposited in the cut-off area 32 and moving below the dam on their return to the gathering area will be forced to remain below the glass surface for a period of time sufficient to insure complete reheating and reassimilation by the main body of glass before returning to the gathering area. The two side arms or branches 34 may conform substantially to the curvature of the side walls of the recess 20 (Fig. 9), providing individual return channels of substantially uniform width throughout their length, connecting the cut-off receiving area 32 and the gathering area 31. The extremities of these side arms or branches 34 are preferably stepped downwardly a slight degree below the glass surface to avoid undue restriction of the channels 90 which provide communication between the cut-off and gathering areas (Figs. 5 and 6). The dam is supported in spaced relation to the bottom of the tank bottom by legs 35 formed at the ends of the side arms 34 and at the juncture of said arms and the transverse bar 33, thereby providing submerged passageways interconnecting the gathering and cut-off areas. Thus, it is seen that chilled glass may return to the gathering area by way of the submerged passageways and by a surface movement through the channels 90 between the dam and tank walls.

The supply channel 23 leading to the gathering area of the stationary tank is covered by a stationary hood 40 (Figs. 5 and 9), said cover being of substantially inverted U-shape in cross section and provided at its inner end with a stack 41. An adjustable damper 42 is hinged to a transverse rod 43 at the upper end of said stack and is provided with an adjustable stop 44 which regulates the extent to which the damper closes. A depending finger 45 is fixed to the damper supporting shaft 43 and is so positioned that it is periodically engaged by an upstanding lug 46 formed on a reciprocable cover or hood 50. Movement of the hood 50 regulates the control damper 42 through the finger and lug, as will be apparent hereinafter.

This reciprocable hood or cover 50 includes a metal casing 51 supporting a liner 52 of suitable refractory material, insulation 53 being interposed between said casing and liner. The forward end of this hood 50 is enlarged and formed with a transverse combustion chamber 54 opening through the lower side of said head directly over the molten glass contained in the working tank. Any approved type of injectors 55 may be arranged at the ends of the combustion chamber 54 to supply fuel to the latter. This combustion chamber 54 (Fig. 9) is of substantially the same width as the body of glass in the widest section of the gathering area so that application of heat to the entire glass surface is assured. The reciprocable hood or cover 50 is of substantially inverted U-shape in cross section from its inner end to a point in proximity to the combustion chamber (Figs. 5 and 9), the depending sides 56 extending downwardly adjacent the sides of the supply channel cover 40 (Fig. 9). The cover 50 is provided on its lower side with a pair of spaced longitudinal channels 57 adapted to receive an upstanding longitudinal rib 58 formed on the side walls of the stationary tank, such construction preventing lateral outward movement of heat into contact with metal supporting units.

The parallel channels 18, heretofore referred to in connection with the tank casing 16, contain a quantity of sand or the like material into which depending ribs or flanges 60 carried by the reciprocable hood 50 project. Thus, a sand seal is created along the sides of the tank, preventing improper draft conditions in so far as entry of outside air at these points is concerned. These flanges 60 are carried by metal side plates 61 attached to the hood casing 51 (Figs. 1 and 9), said plates in turn supporting outwardly extending bearings 62. Adjusting screws 63 are threaded through these bearings 62 and connected at their lower ends to depending rods 64 which have swivel connection to wheel carriers 65. The wheels 66 supported in these carriers 65 ride on tracks or rails 67 which are bolted or otherwise fixed to brackets 68 carried by the tank casing or frame 16 (Figs. 1 and 9). Adjustment of the screws 63 controls the spacing of the reciprocable hood 50 over the stationary tank.

The hood 50 is intended to be reciprocated from time to time for the purpose of enclosing the gathering and cut-off receiving areas to reheat the glass in said areas. This cover may be moved in alternation with the gathering periods or may be retained in its innermost position during several charge gathering operations and then moved forwardly as indicated by dotted lines in Fig. 7. In either event, reciprocation of the hood will be effected in timed relation to movement of the gathering mold "M".

An air motor 75 is supported on a bracket 76 at each side of the tank in proximity to the track 67 which supports the hood to reciprocate the hood 50 as required. Compressed air is supplied to these motors 75 through pipe lines 77 leading from a single air pressure chamber 78 which may be located beneath and supported by the tank proper. Valves 79 (Fig. 9) control the flow of compressed air into these pipes 77, said valves being operated periodically by cams 80 on a cam shaft 81 carrying a bevel gear 82 at one end running in mesh with a bevel gear 83 fixed to a vertical shaft 84. This vertical shaft 84 may be continuously or periodically rotated in timed relation to movements of the gathering mold "M" so that the hood or cover 50 will be operated at proper intervals. Connection between the air motors 75 and the hood 50 is effected by providing brackets or arms 85 at opposite sides of said hood and rigidly connecting these brackets to the outer ends of the piston rods 86 of said air motors.

In operation, the hood 50 is moved rearwardly to its innermost position (Figs. 1 and 5) under influence of the air motors 75, said inward movement being effected in timed relation to the movement of gathering mold "M" and being controlled by the cam actuated valves in the compressed air tank 78. While the hood 50 is in its innermost position, the gathering mold "M" dips into the glass in the gathering area 31, gathers its charge or charges of glass, and is then lifted out of contact with the glass in a path leading over the cut-off receiving area 32. At a predetermined point, the cut-off "C" operates to sever the chilled tail of glass from the mold "M", causing deposit of said chilled portions in the cut-off receiving area. In the event the timing is such that the cover is to enclose the gathering area during the intervals between each gathering period, outward movement of said cover or hood 50 will begin simultaneously with initial lifting of the gathering mold "M". Movement of the hood to its outermost position, indicated by the dotted lines in Fig. 7, brings the combustion chamber to a point at which it will apply the products of combustion directly to the glass in the gathering and cut-off receiving areas. While portions of the chilled glass in the gathering area will move beneath the surface, pass under the dam and thereby return to the gathering area, there will be more or less surface movement through the channels formed by the adjacent walls of the recess 20 and the U-shaped dam, due to gathering of glass from within the confines of the U-shaped dam and the natural tendency of the glass to flow to the gathering area from all directions. Because of the fact that the chilled cut-off portions of glass must either pass beneath the dam or slowly move around the dam and enter the gathering area with fresh glass, it is obvious that the glass in the gathering area will at all times be in the best condition possible.

While the cover 50 is in its outermost position and the heat is being applied directly from the combustion chamber to the glass in the gathering area, the draft control damper 42 is sufficiently closed so that the rate of movement of the products of combustion over the glass in the rear portion of the gathering area and the supply channel 23 is materially reduced. This condition permits more intimate contact between the products of combustion and the surface of the glass than when the control damper is open, thereby contributing materially to the maintenance of desired viscosity in the glass. Inward movement of the cover 50 to the position shown in Fig. 5, causes engagement between the upstanding lug 46 on the hood and the depending finger 45 on the damper carrying shaft 43. Further, inward movement of the cover 50, causes the damper 42 to open (Fig. 5), increasing the draft and rate of movement of the products of combustion through the chamber over the channel 23. Because of this increased draft, and the tendency for the products of combustion to follow the shortest path to the stack 41, there will be more intimate contact between the supply channel or trough cover 40 and the products of combustion causing heating of the cover block to a comparatively high degree. When the cover 50 is in its outermost position and the draft is decreased to lower the rate of movement of the products of combustion over the glass, there will be more or less heat radiated from the channel cover block 40 and applied to the glass surface in the channel, thereby further assisting in maintaining proper glass condition. Thus, it is seen that the stationary and reciprocable cover arrangement provides highly efficient means whereby the supply channel 23, gathering area from which charges are periodically gathered, and the cut-off receiving area, may be completely covered and the glass therein properly heated.

Manifestly, certain minor changes may be resorted to within the spirit and scope of the appended claims.

What I claim is:

1. In combination, a tank to contain molten glass and including a gathering area, a stationary cover for a portion of said tank, and a reciprocating cover slidable over a portion of the stationary cover and adapted to alternately expose and cover said gathering area, said covers arranged and shaped to provide a space over the glass in the tank, said space extending above the walls of the tank.

2. In combination, a tank to contain molten glass and including a gathering area, a stationary cover for a portion of said tank, a reciprocating cover slidable over a portion of the stationary cover and adapted to alternately expose and cover said gathering area, and glass heating means carried by the reciprocating cover.

3. In combination, a tank to contain molten glass and including a gathering area, a stationary cover for a portion of said tank, a reciprocating cover slidable over a portion of the stationary cover and adapted to alternately expose and cover said gathering area, glass heating means carried by the reciprocating cover, and a mold movable to charge gathering position in timed relation to movements of the reciprocating cover.

4. In combination, a tank to contain molten glass and including a gathering area, a stationary cover for a portion of said tank, a stack rising from the stationary cover, a draft control damper for said stack, a reciprocating cover movable to alternately expose and cover the gathering area, glass heating means carried by the reciprocating cover, and means actuated by movement of the reciprocating cover to regulate the draft control damper.

5. In combination, a tank to contain molten glass and including a gathering area, a stationary cover for a portion of said tank, a stack rising from the stationary cover, a draft control damper for said stack, a reciprocating cover movable to alternately expose and cover the gathering area, glass heating means carried by the reciprocating cover, means actuated by movement of the reciprocating cover to regulate the draft control damper, and a gathering mold movable to a position to gather charges from said gathering area in timed relation to movements of the reciprocating cover.

6. A tank to contain molten glass including a relatively wide gathering area from which charges of glass are periodically gathered by suction and a relatively narrow open trough merging into the gathering area, means for causing a flow of molten glass forward thru the trough to said gathering area, and a dam forming the forward boundary of the gathering area and the rear wall of a cut-off receiving area, the forward boundary of the cut-off receiving area being formed by the tank wall.

7. In combination, a stationary tank to contain molten glass and including a gathering area from which charges are periodically gathered by suction, a stationary cover for a portion of said tank, and a movable cover shiftable to and from a position over the stationary cover to alternately cover and expose a gathering area, said covers arranged and shaped to provide at all times a space over the glass in the tank, said space extending above the walls of the tank.

8. In combination, a tank to contain molten glass and including a gathering area from which charges are periodically gathered by suction, a stationary cover for a portion of said tank, a movable cover shiftable to and from a position over the stationary cover to alternately cover and expose a gathering area, a combustion chamber at one end of said movable cover opening directly over the glass surface, and means for injecting fuel into said chamber.

9. In combination, a tank to contain molten glass and including a gathering area from which charges are periodically gathered by suction, a stationary cover for a portion of said tank, a movable cover shiftable to and from a position over the stationary cover to alternately cover and expose a gathering area, a combustion chamber at one end of said movable cover opening directly over the glass surface, means for injecting fuel into said chamber, a stack formed on the stationary cover, and means controlled by movement of the movable cover to regulate draft conditions beneath the stationary cover and in the stack.

10. In combination, a tank to contain molten glass, a substantially U-shaped dam dividing the tank into gathering and cut-off receiving areas, means for causing a flow of molten glass to the gathering area thru the open side of the U-shaped dam, and automatic means for gathering charges of glass from said gathering area and depositing cut-off portions of glass on the side of the dam opposite said gathering area.

11. A dam for a glass container comprising a substantially U-shaped unit, and depending legs formed at intervals on said unit.

12. The combination of a furnace tank to contain molten glass, an extension from said tank providing a comparatively narrow shallow channel thru which a substantially continuous flow of glass from the tank is maintained, said channel being widened at its forward end to form a gathering tank, a substantially U-shaped dam arranged to divide said gathering tank into charge gathering and cut-off receiving areas, the open side of said dam facing the channel and positioned to permit a direct flow of glass thereinto from the channel, said dam forming with the tank walls oppositely directed channels leading from the cut-off receiving area to the open side of the dam.

13. In combination, a tank to contain molten glass, a substantially U-shaped dam arranged to divide the tank into charge gathering and cut-off receiving areas, said dam forming with the tank walls oppositely directed channels leading from the cut-off receiving area to the open side of the dam, and means for causing a continuous flow of glass to the charge gathering area through the open side of the dam.

14. The combination of a tank to contain molten glass, an extension thereon providing a channel thru which glass flows from the tank, the forward portion of said channel providing a gathering area and a cut-off receiving area, means for gathering charges of glass at said gathering area and depositing cut-off portions of glass at the receiving area, a hood over said channel, a burner carried by said hood, and means for reciprocating said head lengthwise of the channel and periodically exposing the gathering area, said burner arranged to direct a flame against the cut-off receiving area when the hood is in its forward position and to direct the flame against the glass flowing along the channel before it reaches the gathering area when the hood is in its retracted position.

15. The combination of a tank to contain molten glass, a cover therefor, means for effecting a relative movement of the tank and cover for exposing a gathering area, and means for forming a seal between the cover and tank, said sealing means comprising channels connected with the tank, comminuted material within said channels, and ribs carried by the cover and extending downward into said material.

16. The combination of a tank to contain molten glass, a cover for said tank, means for periodically reciprocating the cover in a horizontal direction, channels extending along the sides of the tank, a finely divided material within said channel, ribs carried by said cover and extending lengthwise of said channels, the lower portions of the ribs being imbedded in said material to form a seal between the tank and cover.

17. The combination of a furnace tank to contain molten glass, a container located externally of the tank, a channel through which glass flows by gravity from the furnace tank to the container for maintaining a gathering pool in the container, the floor of said channel being at a substantially higher level than the floor of the furnace tank and below the normal level of the glass in the container, a burner arranged to apply heat to the surface of the glass passing thru said channel, and means for adjustably regulating the amount of heat supplied by said burner.

Signed at Toledo, in the county of Lucas and State of Ohio, this 14th day of February, 1927.

LEONARD D. SOUBIER.